March 20, 1956
B. V. McBRIDE
2,739,071
FLUID PASTY INSULATING COMPOSITION AND
AN ELECTRICAL MEMBER CONTAINING IT
Filed Dec. 8, 1951
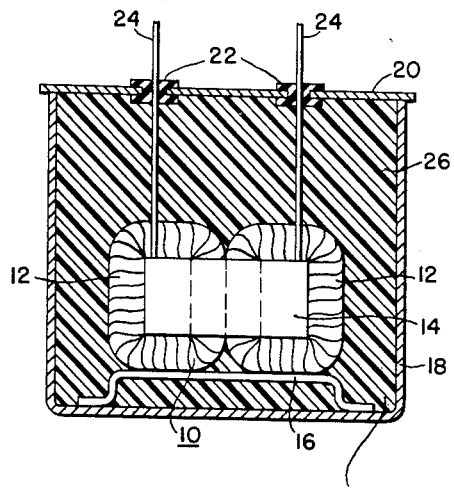
Hardened insulating composition comprising a drying oil and a bentonite – amine reaction product.
WITNESSES:
John E. Heasley
W. B. Northam
INVENTOR
Byron V. McBride
BY
Frederick Shapoe
ATTORNEY

United States Patent Office 2,739,071
Patented Mar. 20, 1956

2,739,071

FLUID PASTY INSULATING COMPOSITION AND AN ELECTRICAL MEMBER CONTAINING IT

Byron V. McBride, Irwin, Pa., assignor to Westinghouse Electric Corporation, East Pittsburgh, Pa., a corporation of Pennsylvania Application December 8, 1951, Serial No. 260,601

5 Claims. (Cl. 106—228)

This invention relates to an improved hardenable filling composition suitable for use as an insulating potting material for the encasing of electrical apparatus, and as a putty.

Heretofore, small proportions of bentonite-organic base reaction products have been utilized to vary the viscosity of various organic liquids. For this purpose, not over 15% by weight has been incorporated in organic solvents or other other organic liquids.

In the polymerization of liquid resinous compositions and drying oils to solid polymers, it is well known to those skilled in the art that shrinkage in the order of 10% or more occurs. When a polymerizable liquid resinous composition is introduced into a casing containing electrical members and polymerized in order to provide potting insulation, the polymerized solid shrinks in volume and may draw away from the walls of the casing. At times, cracks and fissures form in the cured body of the polymer. These spaces, cracks, and fissures permit moisture to penetrate and lower the insulation resistance of the applied potting material.

An object of this invention is to provide a hardenable, fluid filling composition comprising a drying oil that upon curing to a solid state has no substantial volume shrinkage.

Another object of the invention is to provide enclosed electrical apparatus provided with a hardened insulating composition comprising a drying oil and a bentonite-amine reaction product, the composition being free from shrinkage defects.

Other objects of the invention will become more apparent from the following description thereof.

For a fuller understanding of the nature and objects of the invention, reference may be had to the following detailed description, taken in conjunction with the accompanying drawing, in which the single figure is a view in elevation, partly in cross section, of a transformer, the casing of which is filled with the insulating filling compound of the present invention.

According to this invention, a hardenable filling composition having novel properties is prepared by thoroughly admixing a large proportion of a bentonite-organic base reaction product with a drying oil. The composition may be either in the fluid or in the plastic state, depending upon the weight ratio of the bentonite-organic base to drying oil. The weight ratios of the components may be in the order of from 30% to 75% of the bentonite-organic base reaction product and from 70% to 25% of the drying oil. Relatively inert solid fillers, preferably those which are finely divided, may comprise up to 50% by weight of the composition. One or more solid fillers may be used. Examples are wood flour, silica flour, finely divided mica (e. g., 100 to 325 mesh), asbestos fibers, chopped glass fibers, iron oxide, and alumina.

The prepared composition may be cured to a solid state by being allowed to stand at room temperature from 20 to 24 hours or the curing may be hastened by heat treating at a temperature of from 50° C. to 120° C.

The bentonite-amine base reaction products employed in this invention are composed of a montmorillonite mineral in which at least a part of the cation content of the mineral has been replaced by a cation of an organic base. Clays that contain as a primary constituent a mineral of the group known as montmorillonites are generally referred to as bentonites. Bentonites in their raw state are hydrophilic but upon reacting with organic bases or their salts become organophilic products.

More specifically, a bentonite clay of the character described and exhibiting substantial base-exchange capacity is reacted with an organic compound, more particularly one generally known as an onium compound, by substituting for the clay cation the cation of the organic compound. The reaction product may be prepared not only from a base-salt reacted with a clay-salt, but from a free base reacted with an acid clay.

Examples of organic base compounds and their salts usable in the practice of the invention are salts of aliphatic, cyclic, aromatic, and heterocyclic amines; primary, secondary, and tertiary amines and polyamines; also quaternary ammonium compounds, as well as other monovalent or polyvalent onium compounds.

In practicing this invention, aliphatic amine salts having from 12 to 20 carbon atoms, for example, hexadecyl amine salts and octadecyl amine salts, yield excellent results. The ratio of the amine compound to bentonite may be varied within certain limits in converting the bentonite to the organophilic condition. In general, however, it is desired to react the amine salt with the bentonite in the approximate ratio of 100 milliequivalents of amine salt to 100 grams of bentonite. Reaction products produced within this ratio give the maximum swelling as tested in nitrobenzene.

It is to be understood that when reference is made to basic organic onium compounds such as amines, it is implied that before reacting with the clay by base-exchange, the amine is converted to the onium form either by the addition of acid or by reason of the fact that some part of the inorganic base in the naturally occurring clay consists of hydrogen.

An example of the preparation of a suitable bentonite-amine reaction product is as follows:

One thousand grams of a Wyoming bentonite is dispersed in 25.45 liters of water, and the slurry formed is allowed to stand for two hours to settle out the non-clay impurities. In a separate vessel, 54.37 grams of glacial acetic acid is added to 240 grams of octadecyl amine, and the amine salt is then dissolved in 1.45 liters of warm water. Upon addition of the amine salt solution to the dispersed bentonite, flocculation occurs and the precipitate, after being filtered, washed, dried and pulverized, constitutes the bentonite-organic base reaction product.

Other examples of suitable onium compounds and processes indicating how a bentonite-organic base reaction product may be prepared are found in the patent to Jordan 2,531,440, issued November 28, 1950, and the patent to Hauser 2,531,427, issued November 28, 1950. One or more of the bentonite-amine reaction products may be applied to the drying oil.

The drying oils utilized in this invention are those well known in the art. The following drying fatty oils, or mixtures thereof are examples of those which may be conveniently used; candlenut, dehydrogenated castor oil, linseed, oiticica, perilla, poppy seed, safflower, soya bean, sunflower, tung, etc.

Catalysts comprising the heavy metal soaps may be added to the drying oils to accelerate hardening and drying. These are well known as "driers." Examples of these soaps are lead abietate, cobalt laurate, manganese naphthenate, and lead naphthenate. The soaps are preferably applied by admixing with the drying oil either in solution or in a finely divided state.

Various examples of filling compounds of this invention will now be described.

*Example I*

A filling compound was made by thoroughly admixing the following by weight:

| | Percent |
|---|---|
| Raw linseed oil | 50 |
| Octadecyl amine bentonite reaction product | 25 |
| Silica of colloidal fineness | 25 |

This mixture forms a thick paste which does not sag when applied on a vertical surface in a film thickness of ¼ inch. When heated to a temperature of about 50° C. for a few minutes, the pasty material is converted to a soft rigid mass with no volume shrinkage. No change in hardness or rigidity of the hardened mass occurs after three weeks exposure to room atmosphere. The original unconverted mixture likewise shows no change in consistency after three weeks exposure to room atmosphere except for slight surface drying.

*Example II*

Another mixture is made by admixing the following:

| | Percent weight |
|---|---|
| Raw linseed oil | 37 |
| Octadecyl amine bentonite reaction product | 31.5 |
| Finely divided fibrous talc | 31.5 |

This mixture forms a thick paste which may be applied by spreading with a flat blade. When heated to 50° C. for a few minutes, it is converted to a hard rigid mass with no volume shrinkage. No change in hardness or rigidity occurs after three weeks exposure to room atmosphere except for slight surface drying.

*Example III*

Another mixture is made by mixing the following:

| | Percent weight |
|---|---|
| Dehydrogenated castor oil | 40 |
| Octadecyl amine bentonite reaction product | 60 |

This mixture forms a fluid paste which can be poured into a deep crevice and subsequently converted to a solid mass by heating to a temperature of 50° C. This mixture is also converted to a solid mass at room temperature in about four days.

*Example IV*

A plastic putty is made by mixing 100 parts by weight of an octadecyl amine-bentonite reaction product and 100 parts by weight of 325-mesh mica and forming a paste by addition thereto of 250 parts by weight of heat-thickened tung oil containing approximately 3% by weight thereof of lead and cobalt driers. This mixture is converted to a solid mass in a closed container in about 18 hours at room temperature.

The physical properties and the water and oil resistances of the solidified mixtures vary in accordance with the type and relative proportions of the oils and fillers used. It is possible, therefore, to formulate mixtures having properties within a wide range of characteristics ranging from soft to hard masses, having dense to porous structures and any suitable degree of water and oil resistance. The masses made with fast-drying oils, such as linseed and tung oil, did not show any signs of disintegrating when immersed for 48 hours in water or light lubricating oil. The castor oil-bentonite-amine reaction product mixtures have good resistance to water.

Referring now to Fig. 1 of the drawing, there is illustrated an encased transformer 10. The transformer comprises a plurality of cores 12, associated with a winding 14, all mounted on a base 16. These electrical members are disposed within a casing 18 which may be of metal, porcelain, or other suitable material. A cover 20 attached to the casing 18 is provided with insulating bushings 22 through which conductors 24 from the electrical coil 14 passes. The casing is filled with a hardening filling compound 26 comprising a mixture of a bentonite-amine reaction product and a drying oil which polymerizes at room temperature to a solid without any substantial shrinkage.

Since certain changes may be made in the above article and different embodiments of the invention can be made without departing from the scope thereof, it is intended that all matter contained in the above description or shown in the accompanying drawing shall be interpreted as illustrative and not in a limiting sense.

I claim as my invention:

1. A composition of matter comprising a fluid-pasty filling composition adapted for use as an insulating material for the encasing of electrical apparatus, said composition comprising as its essential ingredients from 30% to 75% by weight of a bentonite-amine reaction product and from 70% to 25% by weight of a drying fatty oil, and said composition being curable to a solid mass on standing at room temperature.

2. An article of manufacture comprising a casing, an electrical member positioned within the casing, and a cured solid filling composition within the casing and surrounding said electrical member, the filling composition comprising as its essential ingredients 30% to 75% by weight of a bentonite-amine reaction product and the balance being a drying fatty oil.

3. An article of manufacture comprising a casing, an electrical member positioned within the casing, and a cured solid filling composition within the casing and surrounding said electrical member, the filling composition comprising as its essential ingredients 30% to 75% by weight of a bentonite-amine reaction product and the balance being a drying fatty oil, there being added to the composition an inert finely divided filler compound in an amount not exceeding 50% of the weight of the composition.

4. An electrical member comprising a casing having an opening therein, a cover for closing said opening, an electrical member positioned within the casing and having its conductors extending through said cover, and a cured solid filling composition disposed within said casing and surrounding said electrical member, the cured solid filling composition comprising as its essential ingredients 30% to 75% by weight of a bentonite-amine reaction product and from 70% to 25% by weight of a drying fatty oil, said composition having been cured to a solid mass by standing at room temperature.

5. An electrical member as set forth in claim 4 wherein the drying fatty oil of the filling composition is at least one oil selected from the group consisting of raw linseed oil, castor oil and tung oil.

References Cited in the file of this patent

UNITED STATES PATENTS

| 1,513,148 | Bartlett | Oct. 28, 1924 |
| 2,531,396 | Carter et al. | Nov. 28, 1950 |
| 2,531,412 | Hauser | Nov. 28, 1950 |
| 2,531,427 | Hauser | Nov. 28, 1950 |
| 2,531,440 | Jordan | Nov. 28, 1950 |
| 2,559,398 | Capell | July 3, 1951 |
| 2,579,036 | Edelman | Dec. 18, 1951 |
| 2,622,987 | Ratcliffe | Dec. 23, 1952 |

OTHER REFERENCES

"Vermiculite Cushioning," Modern Packaging, June 1951, pp. 80–81.

"Organophilic Bentonites I Swelling in Organic Liquids," John W. Jordan—The Journal of Physical and Colloid Chemistry, vol. 53, No. 2, Feb. 1949, pp. 294–305.